United States Patent [19]
Lloyd et al.

[11] Patent Number: 5,802,522
[45] Date of Patent: Sep. 1, 1998

[54] METHOD AND SYSTEM OF STORING DATA BLOCKS THAT HAVE COMMON DATA ELEMENTS

[75] Inventors: Scott E. Lloyd, Hoffman Estates; Shay-Ping T. Wang, Long Grove, both of Ill.

[73] Assignee: Motorola, Inc., Schaumburg, Ill.

[21] Appl. No.: 775,470

[22] Filed: Dec. 30, 1996

Related U.S. Application Data

[63] Continuation of Ser. No. 296,041, Aug. 23, 1994, abandoned.

[51] Int. Cl.$^6$ ........................... G06F 12/02
[52] U.S. Cl. .................. 707/101; 711/165; 341/55
[58] Field of Search ............... 395/497.04, 612, 395/621, 492; 341/55; 707/101; 364/736.01, 736.04; 711/173, 165

[56] References Cited

U.S. PATENT DOCUMENTS

| | | |
|---|---|---|
| 3,643,016 | 2/1972 | Dattilo ............................. 358/438 |
| 4,286,329 | 8/1981 | Goertzel et al. .................. 364/419.09 |
| 4,633,296 | 12/1986 | Cham et al. ....................... 348/403 |
| 5,148,292 | 9/1992 | Kutaragi .......................... 358/433 |
| 5,343,559 | 8/1994 | Lee ................................. 395/412 |
| 5,410,725 | 4/1995 | Skruhak et al. ................... 395/800 |

*Primary Examiner*—Eddie P. Chan
*Assistant Examiner*—Hiep T. Nguyen
*Attorney, Agent, or Firm*—James E. Gauger

[57] ABSTRACT

In a method and system for storing a plurality of data blocks in a memory device, blocks of data elements are stored in a two-dimensional address space such that blocks overlap in the address space. The data elements may be digital words which represent exponents of a polynomial expansion. An overlapping data block is segmented into sub-blocks which are separated by null regions. Common data elements that are shared among the blocks are non-redundantly stored in the memory device.

3 Claims, 4 Drawing Sheets

—PRIOR ART—

METHOD AND SYSTEM OF STORING DATA BLOCKS THAT HAVE COMMON DATA ELEMENTS

This is a continuation of application Ser. No. 08/296,041, filed Aug. 23, 1994 and now abandoned.

RELATED INVENTIONS

The present invention is related to the following inventions which are assigned to the same assignee as the present invention:

(1) "Neural Network and Method of Using Same", having Ser. No. 08/076,601, filed on Jun. 14, 1993.

(2) "Method and System for Storing Data in a Memory Device", having Ser. No.08/288,673, filed on Aug. 10, 1994.

(3) "Method and System for Storing Data Blocks in a Memory Device", having Ser. No. 08/268,385, filed on Jun. 29, 1994.

The subject matter of the above-identified related inventions is hereby incorporated by reference into the disclosure of this invention.

TECHNICAL FIELD

This invention relates generally to data storage systems and, in particular, to a method and system for storing data in a memory device.

BACKGROUND OF THE INVENTION

Data storage systems are widely used in a variety of computing environments. FIG. 1 shows a computer (10) which includes a data storage system (14). Typically, a data storage system includes a mass storage (16), a memory management unit (22), and a CPU memory (24). The central processing unit (CPU) (12) executes software programs and is connected to memory management unit (22) and CPU memory (24) via bus (20).

Memory management unit (22) controls the transfer of data between mass storage (16) and CPU memory (24), and in some instances it may transfer data between central processing unit (12) and mass storage (16). To move data from mass storage (16) to CPU memory (24), memory management unit (22) reads data blocks from mass storage (16) using bus (18) and then writes the data blocks to CPU memory (24) using bus (20). In a similar fashion, memory management unit (22) may move data blocks from CPU memory (24) to mass storage (16) by first reading the data blocks from CPU memory (24) and then writing them to mass storage (16).

Mass storage (16) typically provides a means for storing large quantities of data at relatively low cost per stored data element. One of ordinary skill in the art will realize that mass storage (16) may comprise a hard disk, an array of random access memory (RAM) chips, or other storage media.

CPU memory (24) stores data and program instructions which are used by CPU (12). One of ordinary skill in the art will understand that CPU memory (24) may be a static or cache RAM which resides on the same integrated circuit as CPU (12). The data stored in CPU memory (24) is accessed by CPU (12) across bus (20). CPU memory (24) allows quicker access to stored data than mass storage (16). However, CPU memory (24) is generally small due to the relatively high cost associated with memory capable of short access times.

CPU memory (24) is generally not large enough to store all of the data needed by CPU (12) during operation. Thus, either CPU (12) must periodically access data from mass storage (16) through memory management unit (22), or memory management unit (22) must periodically update the contents of CPU memory (24). Since mass storage (16) is slower than CPU memory (24), CPU (12) must insert wait states while accessing data from mass storage (16). The insertion of wait states by CPU (12) decreases the overall performance of computer (10). Additionally, in many situations the amount of time required by memory management unit (22) to load data blocks into CPU memory (24) causes CPU (12) to idle, which also decreases the performance of computer (10).

Therefore, there is a significant need for a data storage system which allows data blocks to be stored in a manner that reduces the overall required size of the memory. There is also a need for a data storage system which reduces the time needed to load data into the memory and reduces the swapping of data blocks between the memory and mass storage.

SUMMARY OF INVENTION

It is thus an advantage of the present invention to provide a method for reducing the amount of memory space needed to store data in a memory device.

Another advantage of the present invention is to provide a method of storing data which significantly reduces the amount of time needed to load data into the memory device.

A further advantage of the present invention is that a method is provided which lessens the need to swap data blocks between a memory device and a mass storage device.

In one embodiment of the present invention there is provided a method for storing a plurality of data blocks in a memory device, each of the data blocks having a plurality of data elements. In this method, the plurality of data blocks has a first data block and a second data block. The first step of this method identifies at least one common data element between the first data block and the second data block. The second step forms a modified first data block by segmenting the first data block into a plurality of sub-blocks separated by at least one null region. The third step stores the modified first data block and the second data block in the memory device such that the at least one common data element is stored in a single area in the memory device.

In another embodiment of the present invention there is provided in a computer, which includes a memory device, a memory management unit for storing a plurality of data blocks in the memory device. Additionally, each of the data blocks has a plurality of data elements, and the plurality of data blocks has a first data block and a second data block. The memory management unit includes an identifying means for identifying at least one common data element between the first data block and the second data block. Also, the memory management unit includes a formative means, responsive to the identifying means, for forming a modified first data block by segmenting the first data block into a plurality of sub-blocks separated by at least one null region. In addition, the memory management unit includes a storing means, responsive to the formative means and operatively coupled to the memory device. The storing means stores the modified first data block and the second data block in the memory device such that the at least one common data element is stored in a single area in the memory device.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It will be understood by one of ordinary skill in the art that the methods of the present invention may be implemented in hardware or software, or any combination thereof, and that the terms, "exponent" and "exponent value", "element" and "data element", as well as the terms, "block" and "data block", are used interchangeably in this description.

Figure 1:
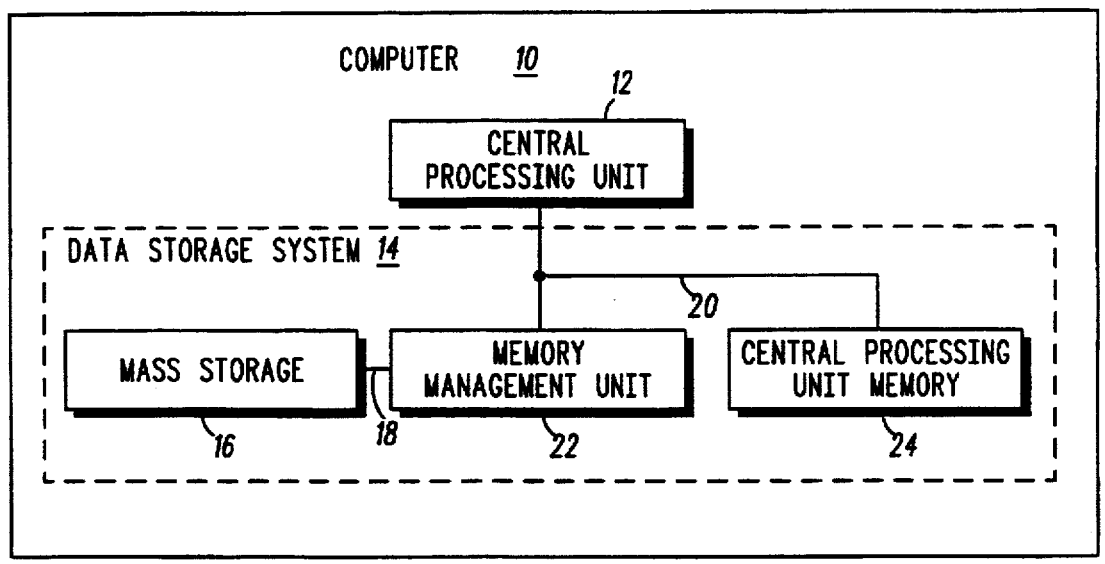
FIG. 1 shows a block diagram of a prior art computer which includes a data storage system.
Figure 2:
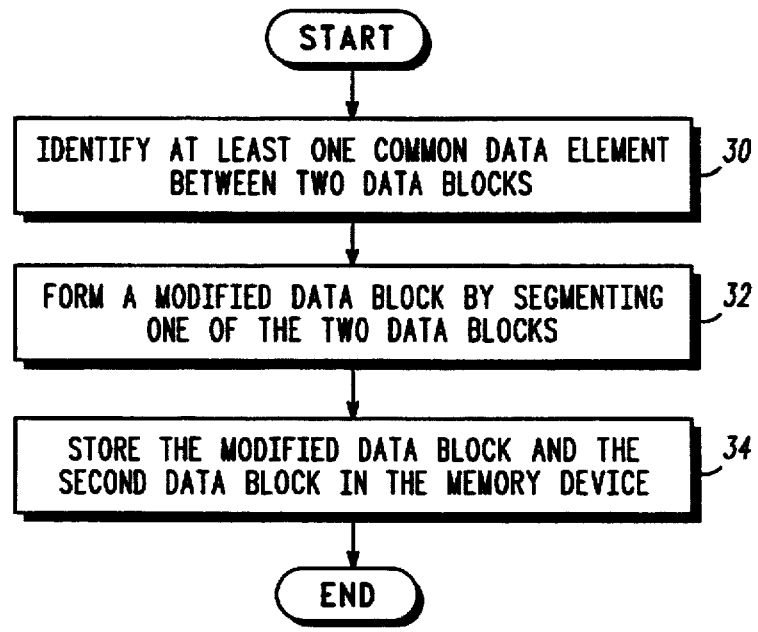
FIG. 2 shows a flow diagram of a method of storing two of a plurality of data blocks in a memory device in accordance with a preferred embodiment of the present invention.

FIG. 2 shows a flow diagram of a method of storing two of a plurality of data blocks in a memory device in accordance with a preferred embodiment of the present invention. In box (30), at least one common data element is identified between a first data block and a second data block, wherein both blocks are selected from the plurality of data blocks. A common data element is a data element which is present in more than one data block, which has the same value in the data blocks, and which may be stored at the same address, or area, in the memory device.

In box (32), a modified first data block is formed by segmenting the first data block into a plurality of sub-blocks. The first block is segmented by inserting null regions between sub-blocks. A null region includes one or more data elements which are extrinsic to the set of data elements contained in the first data block. These extrinsic data elements may be referred to as null data elements.

The purpose of forming a modified first data block is to increase the number of common data elements which are storable in common areas, thus reducing the amount of memory space required to store the two data blocks. In turn, reducing the amount of memory space reduces the amount of time needed to load data into the memory device and also lessens the need to swap data blocks between a memory device and a mass storage device.

Next, in box 34, the modified first data block and the second data block are stored in the memory device. Additionally, the two data blocks are stored such that a common data element between the two blocks is stored in a single area in the memory device.

It will be apparent to those skilled in the art that the first and second data blocks are arbitrarily selected from the plurality of data blocks and that labeling the two data blocks as first and second does not necessarily imply sequential ordering of the plurality of data blocks.

Also, it will be apparent to those skilled in the art that the plurality of data blocks may be stored in the memory device by repeatedly executing the method illustrated by FIG. 2 for other pairs of data blocks selected from the plurality of data blocks.

Figure 3:
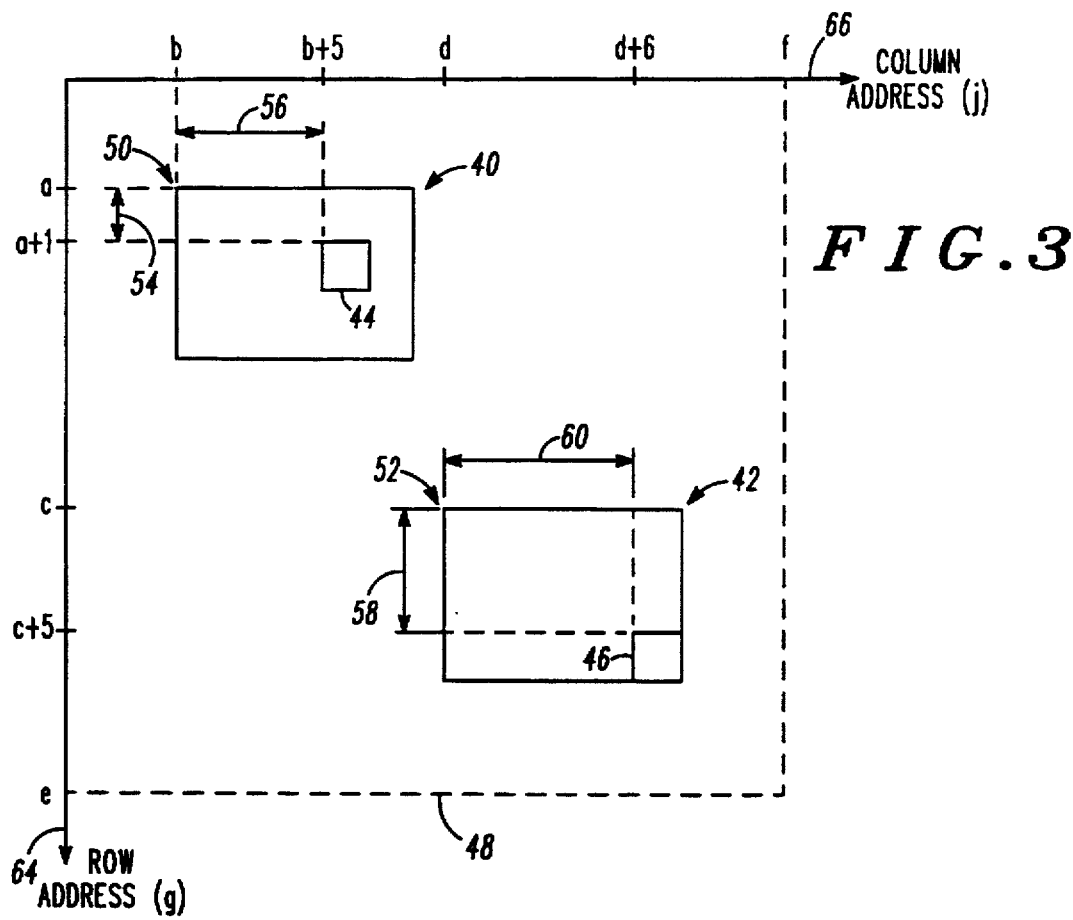
FIG. 3 illustrates an example of a two-dimensional addressing scheme which is used to locate data in a memory device.

FIG. 3 illustrates an example of a two-dimensional addressing scheme which is used to locate data in a memory device. In one embodiment of the present invention, addresses in a memory device are represented by an array which has two indices: a row address and a column address. Thus, a two-dimensional address may be represented as an ordered pair (i, j), where i represents the row address and j represents the column address. A data element may be stored at each two-dimensional address in the memory device. A column of data elements is defined as those elements which have the same column address, whereas a row of data elements is defined as those elements which have the same row address.

Axis (64) represents values of the row address, while axis (66) represents values of the column address. Boundary (48) indicates the memory space of a memory device. A data element may be stored anywhere within the memory space of a memory device. In other words, the two-dimensional address of a data element stored within boundary (48) may be given by (i, j), where $0 \leq i \leq e$, and $0 \leq j < f$.

Data block (40) comprises a plurality of data elements, one of which is shown as data element (44). Data block (40) is referenced by two-dimensional origin address (50). Origin address (50) gives the location of the first data element of data block (40). The first data element is accessed before other data elements of the block. Origin address (50) is given by the ordered pair (a, b). All other data elements within a data block are located at addresses which are relative to the origin address of the data block. For example, the row address of data element (44) is given by the sum of row offset (54) and the row address of origin address (50), and the column address of data element (44) is given by the sum of column offset (56) and the column address of origin address (50). In the example, row offset (54) equals one location and column offset (56) equals five locations. Thus, the resulting two-dimensional address of data element (44) is (a+1, b+5).

Data block (42) is referenced by origin address (52) which is represented by the ordered pair (c, d). Maximum row offset (58) and maximum column offset (60) give the two-dimensional address of data element (46) relative to origin address (52). The maximum row offset and maximum column offset represent the relative address of the last data element of a data block. For example, maximum row offset (58) is equal to five locations, and maximum column offset (60) is equal to six locations. Thus the resulting two-dimensional address for data element (46) is (c+5, d+6).

Figure 4:
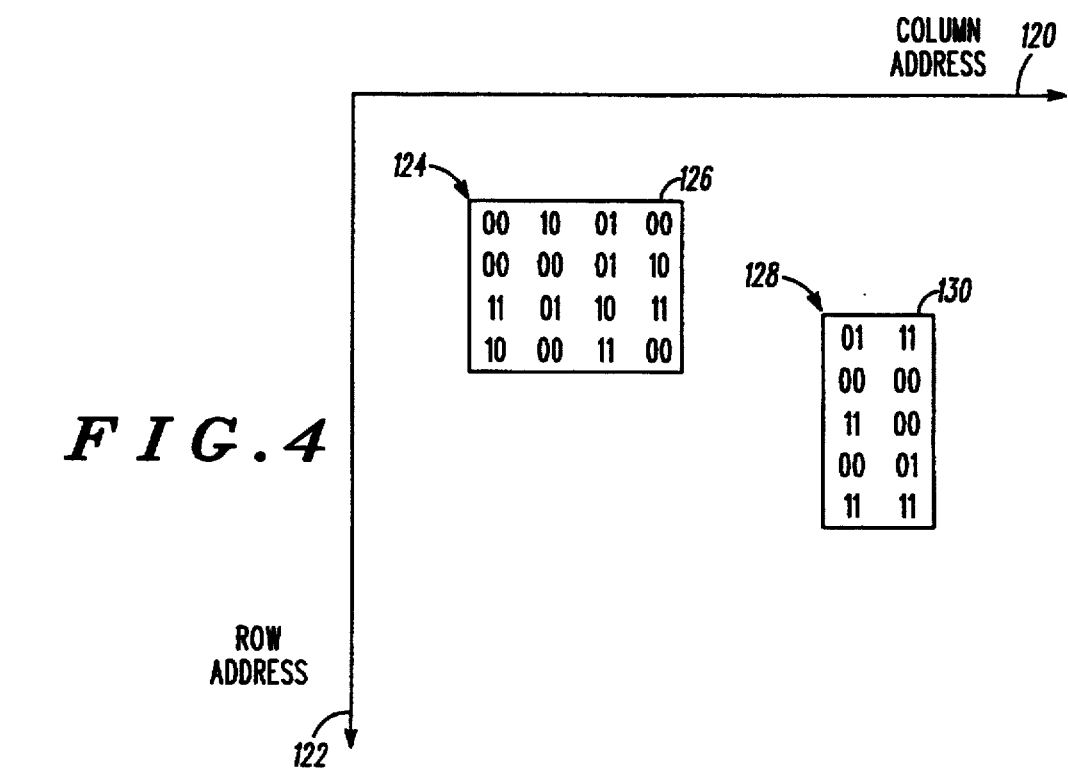
FIG. 4 illustrates an example of two data blocks located in non-overlapping areas of a two-dimensional address space.

FIG. 4 illustrates an example of two data blocks located in non-overlapping areas of a two-dimensional address space. Data block (126) includes sixteen two-bit digital words and is referenced by origin address (124). Data block (130) includes ten two-bit digital words and is referenced by origin address (128). Axis (120) indicates the column address, and axis (122) indicates the row address of the two-dimensional address space.

Figure 5:
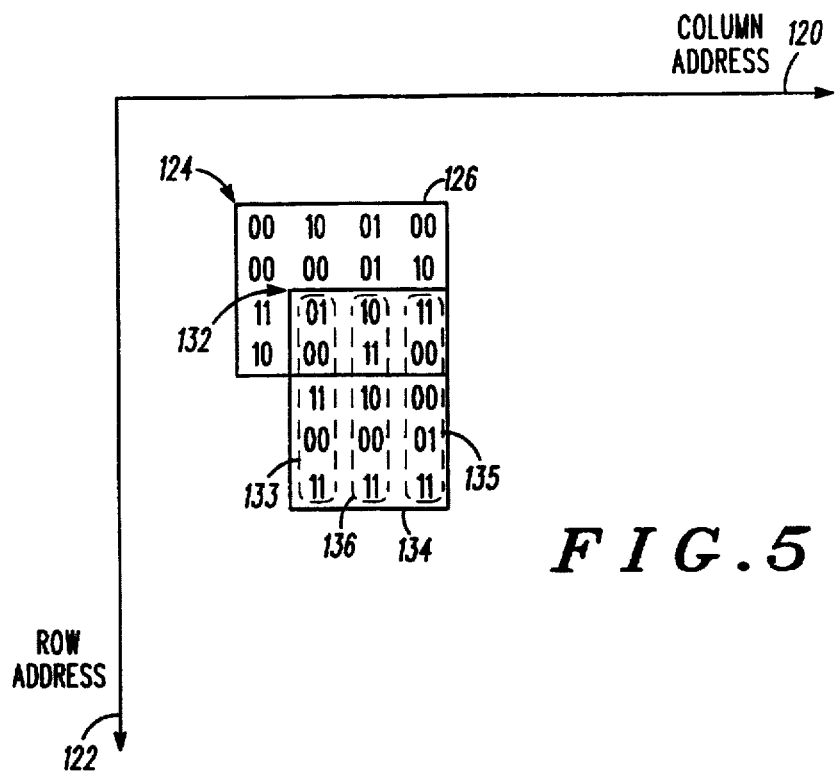
FIG. 5 illustrates an example of the two data blocks of FIG. 4 located in overlapping areas of a two-dimensional address space in accordance with an embodiment of the present invention.

FIG. 5 illustrates an example of the two data blocks of FIG. 4 located in overlapping areas of a two-dimensional address space in accordance with one embodiment of the present invention. Data block (126) remains at the location given by origin address (124). However, data block (130) of FIG. 4 is segmented into sub-block (133) and sub-block (135). The two sub-blocks are separated by null region (136). The segmenting of data block (130) results in modified data block (134) which is moved to a new location given by origin address (132). The new location of data block (134) allows some data elements from both blocks having the same value to share the same two-dimensional addresses. Data elements which are from different data blocks, which have the same value, and which may be stored at the same two-dimensional address are referred to as common data elements.

In the example, modified data block (134) includes only one null region, that is null region (136); furthermore, null region (136) includes only one column of null data elements. However, it will be realized by one of ordinary skill that a modified data block may include more than one null region, and that a null region may include more than one column of null data elements. In addition, one of ordinary skill will realize that a null region may include one or more rows of null data elements.

By overlapping data blocks such that common data elements are created, the present invention reduces the amount of memory space required to store one or more data blocks. In the example given, storing data block (126) and modified data block (135) using an embodiment of the present invention requires one less memory location than storing the data blocks by traditional means, as shown in FIG. 4.

FIGS. 4 and 5 illustrate two-bit data elements for purposes of example. Furthermore, FIGS. 3, 4, and 5 are each described in terms of two-dimensional addressing. One with ordinary skill in the art will recognize that any arbitrary data elements could be used, including data elements which contain any number of digital bits, and that addressing could be performed in an n-dimensional sense.

Figure 6:
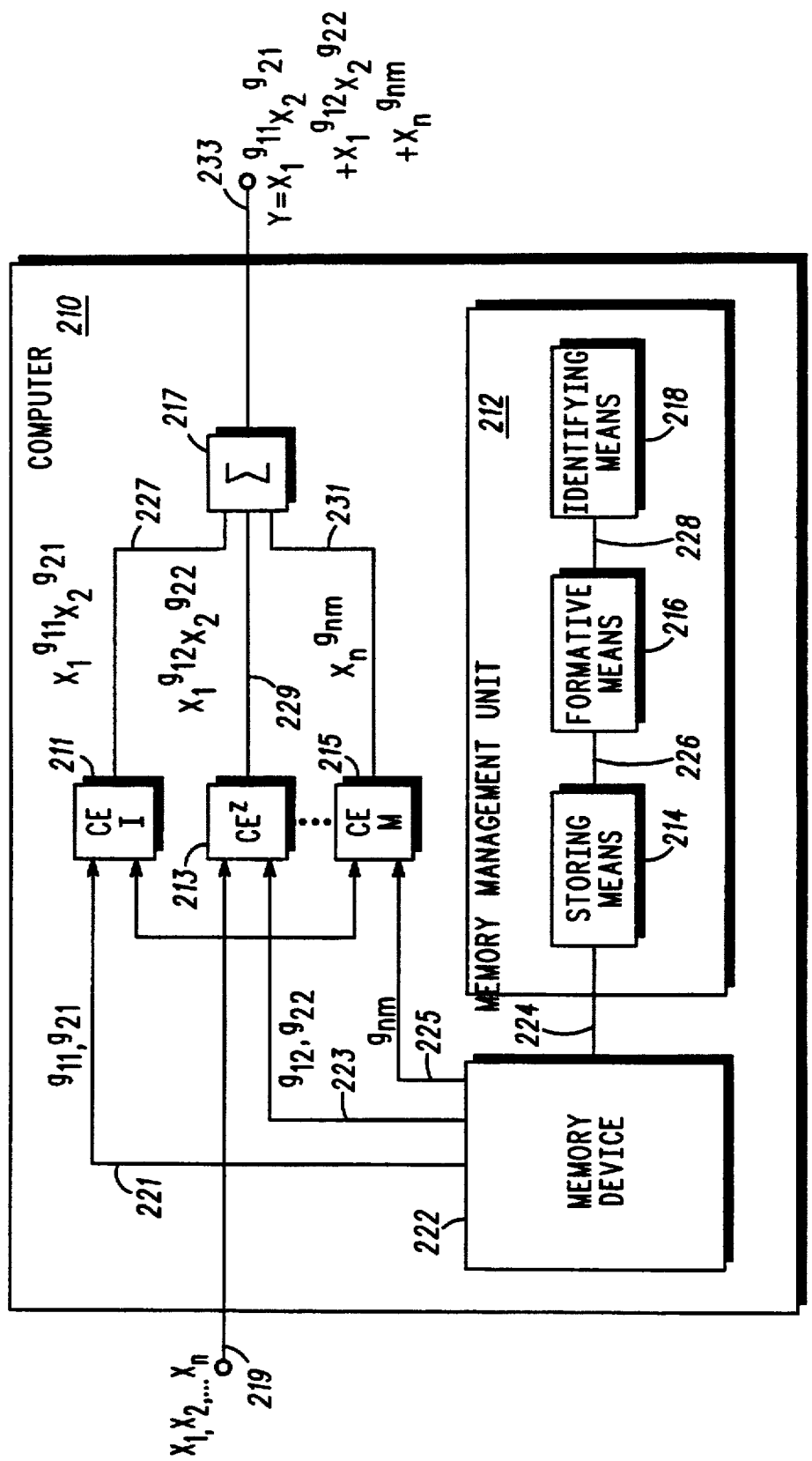
FIG. 6 shows a block diagram of a multiprocessor computer which includes a memory management unit of an embodiment of the present invention.

FIG. 6 shows a block diagram of a multiprocessor computer which includes a memory management unit of one embodiment of the present invention. Computer (210) includes memory device (222), memory management unit (212), summing circuit (217), and a plurality of computing elements, three of which are shown as computing elements (211), (213), and (215).

Computer (210) is used to compute polynomial expansions of the form:

$$y = \sum_{i=1}^{m} w_{i-1} x_1^{g_{1i}} x_2^{g_{2i}} \ldots x_n^{g_{ni}} \qquad \text{Equation 1}$$

where y represents the output of computer (210), which may also be referred to as a dependent variable of the polynomial expansion; where $x_1, x_2, \ldots, x_n$ represent data inputs to computer (210), which may also be referred to as independent variables of the polynomial expansion; where $w_{i-1}$ represents the coefficient of the ith term; where $g_{1i}, \ldots, g_{ni}$ represent the exponents for the ith term in the expansion which are applied to the data inputs; and where i, m, and n are integers.

A polynomial expansion is computed by computer (210) in the following manner. A plurality of data inputs $x_1, x_2, \ldots, x_n$ are fed into computer (210) using bus (219) and then distributed to the plurality of computing elements, of which computing elements (211), (213), and (215) are illustrated. It will be understood by one of ordinary skill in the art that additional computing elements could be provided to implement each of the terms of the polynomial expansion presented in Equation 1 above. Each computing element computes a term in the polynomial expansion and determines which of the data inputs to receive. The computing elements access exponent values which are stored in memory device (222). After computing a term, a computing element passes the term to summing circuit (217) which sums the terms computed by the computing elements and places the sum on computer output (233).

For example, FIG. 6 depicts the computation of the polynomial $y = x_1^{g_{11}} x_2^{g_{21}} + x_1^{g_{12}} x_2^{g_{22}} + \ldots x_n^{g_{nm}}$. In this example, computing element (211) accesses exponents $g_{11}$ and $g_{21}$ from memory device (222) using bus (221), while computing element (213) accesses exponents $g_{12}$ and $g_{22}$ from memory device (222) using bus (223), and computing element (215) accesses exponent $g_{nm}$ from memory device (222) using bus (225). Computing element (211) computes the term $x_1^{g_{11}} x_2^{g_{21}}$ and then sends it to summing circuit (217) over bus (227); computing element (213) computes the term $x_1^{g_{12}} x_2^{g_{22}}$ and then sends it to summing circuit (217) over bus (229); and computing element (215) computes the term $x_n^{g_{nm}}$ and then sends it to summing circuit (217) over bus (231). Upon receiving the terms from the computing elements, summing circuit (217) sums the terms and places the resulting polynomial expansion on computer output (233).

It will be apparent to one of ordinary skill in the art that computer (210) is capable of computing polynomials of the form given by Equation 1 which have a number of terms different from the above example, and polynomials whose terms are composed of data inputs different from those of the above example.

Memory device (222) retains exponent values which are used by the plurality of computing elements. Memory device (222) may retain one or more blocks of exponent values, wherein each of the blocks corresponds to a different polynomial expansion.

Memory management unit (212) includes storing means (214), formative means (216), and identifying means (218). Storing means (214) is operatively connected to memory device (222) by bus (224). Formative means (216) is connected to storing means (214) by bus (226). Additionally, identifying means (218) is connected to formative means (216) by bus (228).

Memory management unit (212) operates in accordance with an embodiment of the present invention to place a plurality of blocks of exponent values in memory device (222) in a fashion which reduces the amount of memory space needed to store the plurality of blocks. Each of the blocks comprises exponent values which are used to compute a corresponding polynomial expansion. In one embodiment of the present invention, memory management unit (212) is implemented by software running on a processor such as a microprocessor. However, one of ordinary skill in the art will recognize that a programmable logic array, ASIC or other digital logic device could also be used to implement the functions performed by memory management unit (212).

The functions of the sub-components of memory management unit (212) are described below.

Identifying means (218) determines whether a first and second data block, both arbitrarily selected from the plurality of data blocks, include exponents which are common data elements. Identifying means (218) does this by determining whether at least one exponent of the first data block equals at least one exponent of the second data block. Identifying means (218) passes information regarding common data elements to formative means (216) via bus (228). Typically, this information includes the two-dimensional addresses of common data elements of the two blocks. However, one of ordinary skill in the art will realize that the information passed across bus (228) is not limited to only the addresses of common data elements.

Upon receiving information regarding common data elements, formative means (216) modifies the first data block by segmenting the first data block into a plurality of sub-blocks separated by at least one null region. Formative means (216) sends information about locating the two data blocks in the memory device to storing means (214) via bus (226). Generally, this information may include origin addresses and maximum row and column offsets of the data blocks. However, one of ordinary skill in the art will realize that the information passed across bus (226) is not limited to addressing information about the data blocks.

Storing means (214) is responsive to the formative means and operatively coupled to the memory device. Storing means (214) stores the modified first data block and the second data block in the memory device such that an exponent which is a common data element is stored in a single area in the memory device.

Storing means (214) signals the memory device (222) via bus (224) to store the two data blocks such that exponents which are common data elements are stored at common locations, or areas, in memory device (222).

Figure 7:
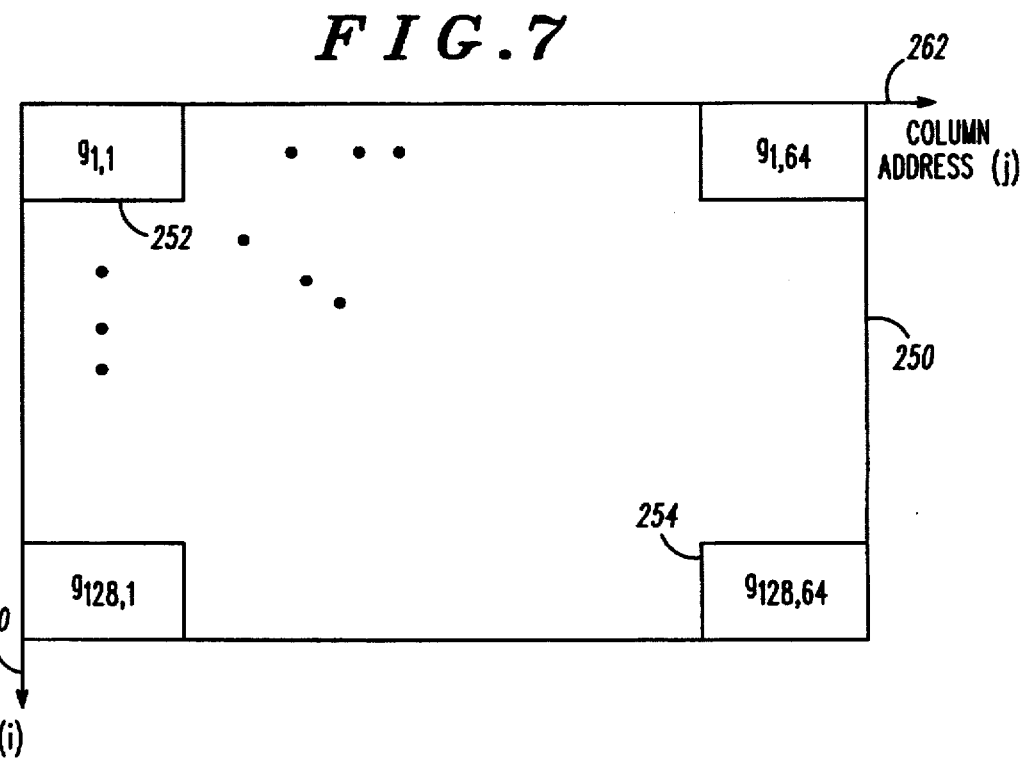
FIG. 7 illustrates an example of a data block which contains exponent values used in an embodiment of the present invention.

FIG. 7 illustrates an example of a data block which contains exponent values. In accordance with an embodiment, data block (250) includes a plurality of data elements, wherein each data element represents an exponent value as a two bit digital word. First data element (252) represents exponent $g_{1,1}$ and last data element (254) represents exponent $g_{128, 64}$. The exponent values of data block (250) are used to compute polynomial expansions of the form given by Equation 1.

Each exponent is located at a two-dimensional address, (i, j), in a memory device, wherein i represents a row address and j represents a column address. Axis (260) represents values of the row address, while axis (262) represents values of the column address.

Data block (250) may be stored in memory device (222) of FIG. 6. In such a case, exponent values may be stored in memory device (222) such that each column address may point to exponent values that are accessed by a specific one of the plurality of computing elements of computer (210) of FIG. 6, and each row address may point to exponents that are applied to a specific one of the plurality of data inputs. For example, data block (250) may be used in computer (210) to provide exponent values for 64 computing elements and 128 data inputs.

As described above for FIG. 6, each computing element may compute a term in a polynomial expansion of the form given by Equation 1. Thus, since each term in the polynomial has an associated coefficient, $w_{i-1}$, each column of exponent values in data block (250) may correspond to a coefficient, $w_{i-1}$. In one embodiment of the present invention, the null regions may include columns of exponents wherein the corresponding coefficient, $w_{i-1}$, is zero. Allowing a coefficient, corresponding to a column in a null region, to equal zero prevents the null data elements, in this case, exponent values which are extrinsic to the computation of the polynomial expansion, from affecting the result calculated by the computing elements.

Another embodiment of the present invention, wherein a null region includes at least one row of extrinsic exponent values, prevents the extrinsic exponents from affecting the calculation of the polynomial expansion by allowing a data input, which corresponds to a row in the null region, to equal one.

Although FIG. 7 shows a data block which has 128 row addresses and 64 column addresses, and 128×64 exponent values, one of ordinary skill will understand that a data block may have any number of row and column addresses and any number of exponent values. Also, one skilled in the art will realize that when data block (250) is stored in memory device (222), the row and column addresses may be interchanged to point at exponents accessed by a specific computing element and to point at exponents corresponding to a specific data input, respectively.

SUMMARY

Thus there has been described herein a concept, as well as several embodiments including a preferred embodiment, of a method for storing data in a memory device which reduces the amount of memory space needed for the data.

Because the various embodiments of methods of storing data as herein-described allow data blocks to overlap when stored in a memory device, they significantly decrease the amount of memory space required to store the blocks and the amount of time required to load the data block, as well as lessen the need to swap data blocks between a memory device and a mass storage device.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method for storing a plurality of data blocks in a memory device, each of the data blocks having a plurality of data elements, the plurality of data blocks having a first data block and a second data block, the method comprising the following steps:

(a) identifying at least one common data element between the first data block and the second data block by determining whether at least one of the plurality of data elements of the first and second data blocks locatable at the same two-dimensional address are equal;

(b) forming a modified first data block by segmenting the first data block into a plurality of sub-blocks separated by at least one null region;

(c) storing the modified first data block and the second data block in the memory device such that the at least one common data element is stored in a single area in the memory device, wherein the plurality of data elements of the first data block represent exponents in a first polynomial expansion, and wherein the plurality of data elements of the second data block represent exponents in a second polynomial expansion; and (d) at least one of a plurality of independent variables of the first polynomial expansion equals one and the exponents applicable to the at least one of the independent Variables correspond to at least one null data element in the at least one null region of the modified first data block.

2. In a computer which includes a memory device, a memory management unit for storing a plurality of data blocks in the memory device, each of the data blocks having a plurality of data elements, the plurality of data blocks having a first data block and a second block, the memory management unit comprising;

identifying means for identifying at least one common exponent code between the first data block and the second data block;

formative means, responsive to the identifying means, for forming a modified first data block by segmenting the first data block into a plurality of sub-blocks separated by at least one null region; and storing means, responsive to the formative means and operatively coupled to the memory device, for storing the modified first data block and the second data block in the memory device such that the at least one common data element is stored in a single area in the memory device, wherein each of the plurality of data elements included in one of the plurality of data blocks represents an exponent in a polynomial expansion having the form $$y = \sum_{i=1}^{m} w_{i-1} x_1^{g_{1i}} x_2^{g_{2i}} \cdots x_n^{g_{ni}}$$

wherein y represents a dependent variable;
wherein i, m, and n are integers;
wherein $w_{i-1}$ represents the coefficient for the ith term;
wherein $x_1, x_2, \ldots x_n$ represent independent variables; and
wherein $g_{1i} \ldots g_{ni}$ represent the exponents for the ith term in the expansion which are applied to the independent variables;
wherein the coefficient of the ith term, $w_{i-1}$, equals zero; and
the exponents of the ith term correspond to null data elements in the at least one null region of the modified first data block.

3. The memory management unit of claim 1 wherein at least one of the independent variables equals one and the exponents applicable to the at least one of the independent variables correspond to at least one null data element in the at least one null region of the modified first data block.

* * * * *